(12) United States Patent
Lacan et al.

(10) Patent No.: US 8,962,141 B2
(45) Date of Patent: *Feb. 24, 2015

(54) METHOD FOR PREPARING A GLASS CONVENIENT FOR TRIMMING, A GLASS THUS OBTAINED, AND METHOD FOR TRIMMING SUCH A GLASS

(75) Inventors: Pascale Lacan, Paris (FR); Dominique Conte, Saint Dizier (FR)

(73) Assignee: Essilor International Compagnie Generale d'Optique, Charenton (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,667

(22) Filed: Jun. 25, 2012

(65) Prior Publication Data

US 2012/0272800 A1 Nov. 1, 2012

Related U.S. Application Data

(63) Continuation of application No. 10/147,560, filed on May 17, 2002, now Pat. No. 8,252,368.

(30) Foreign Application Priority Data

May 17, 2001 (FR) ...................... 01 06534

(51) Int. Cl.
| | | |
|---|---|---|
| *B26D 7/08* | (2006.01) | |
| *B32B 17/00* | (2006.01) | |
| *C03C 17/42* | (2006.01) | |
| *C03C 17/00* | (2006.01) | |

(52) U.S. Cl.
CPC ................ *C03C 17/42* (2013.01); *C03C 17/00* (2013.01); *C03C 2217/76* (2013.01); *C03C 2218/355* (2013.01)
USPC ...................................... 428/411.1; 428/426

(58) Field of Classification Search
USPC .............................. 428/411.1, 426
See application file for complete search history.

(56) References Cited

U.S. PATENT DOCUMENTS

| | | |
|---|---|---|
| 2,392,768 A | 1/1946 | Ryan |
| 2,536,075 A | 1/1951 | MacNutt |
| 4,085,248 A | 4/1978 | Zehender et al. |
| 4,387,960 A | 6/1983 | Tani |
| 4,410,563 A | 10/1983 | Richter et al. |
| 5,328,768 A | 7/1994 | Goodwin |
| 5,582,907 A | 12/1996 | Pall |
| 5,680,013 A | 10/1997 | Dornfest et al. |
| 5,800,918 A | 9/1998 | Chartier et al. |
| 5,919,563 A | 7/1999 | Parish, Jr. et al. |
| 5,945,462 A | 8/1999 | Salamon |
| 5,972,517 A | 10/1999 | Kondo et al. |
| 6,149,750 A | 11/2000 | Parish, Jr. et al. |
| 6,183,872 B1 | 2/2001 | Tanaka et al. |
| 6,364,823 B1 | 4/2002 | Garibaldi et al. |
| 6,491,981 B1 | 12/2002 | Guichard et al. |
| 6,682,773 B2 | 1/2004 | Medwick et al. |
| 6,884,432 B2 | 4/2005 | Yaszemski et al. |
| 7,838,068 B2 | 11/2010 | Lacan et al. |
| 8,252,368 B2 | 8/2012 | Lacan et al. |
| 2003/0059623 A1 | 3/2003 | O'Shaughnessy et al. |
| 2011/0033616 A1 | 2/2011 | Lacan et al. |

FOREIGN PATENT DOCUMENTS

| | | |
|---|---|---|
| EP | 0 203 703 | 12/1986 |
| EP | 0 749 021 | 12/1996 |
| EP | 0 844 265 | 5/1998 |
| EP | 0 933 377 | 8/1999 |
| EP | 1 300 433 | 4/2003 |
| FR | 2 613 275 | 3/1987 |
| JP | 60135167 | 7/1985 |
| JP | 9258003 | 10/1997 |
| WO | WO 9 710 923 | 3/1997 |
| WO | WO 00/68326 | 11/2000 |
| WO | WO 01/02496 | 1/2001 |

OTHER PUBLICATIONS

Definition of "Silane", Merriam-Webster's Collegiate Dictionary, Tenth Edition.
Gutowski, "The relationship between strength of an adhesive bond and the thermodynamic properties of its components," *Int. J. Adhesion and Adhesives*, 7:189-198, 1987.
Owens and Wendt, "Estimation of the surface free energy of polymers," J. Appl. Polymer Sci., 13:1741-1747, 1969.

*Primary Examiner* — Elena T Lightfoot
(74) *Attorney, Agent, or Firm* — Oblon, Spivak, McClelland, Maier & Neustadt, L.L.P.

(57) ABSTRACT

A method for making appropriate for trimming a glass comprising a hydrophobic and/or oil-repellent surface coating is provided, as well as the glass itself, in which the surface of the glass is coated with a temporary protective layer imparting to the glass a surface energy at least equal to 15 mJ/m$^2$.

16 Claims, No Drawings

METHOD FOR PREPARING A GLASS CONVENIENT FOR TRIMMING, A GLASS THUS OBTAINED, AND METHOD FOR TRIMMING SUCH A GLASS

BACKGROUND OF THE INVENTION

The present application claims priority to French Application No. 01/06534 filed 17 May 2001, the entire text of which is specifically incorporated by reference herein without disclaimer.

FIELD OF THE INVENTION

The present invention relates to the field of trimming glasses, more particularly ophthalmic glasses.

DESCRIPTION OF RELATED ART

An ophthalmic glass results from a series of molding and/or surfacing/buffing operations determining the geometry of both convex and concave optical surfaces of said glass, followed by appropriate surface treatments.

The last finishing step of an ophthalmic glass is a trimming step consisting in machining the glass edge or periphery so as to conform it to the required dimensions for adapting the glass to the glass frame in which it is intended to be accommodated.

Trimming is generally carried out on a grinding machine comprising diamond abrasive wheels that perform the machining step as defined hereabove.

The glass is held during such a step by axially-acting clamping elements.

The relative movement of the glass relative to the abrasive wheel is controlled, generally digitally, so as to get the required shape.

As it is obvious, it is absolutely imperative that the glass be firmly held during such a movement.

Therefore, before any trimming step, an glass-holding step is performed, i.e. a holding means or acorn element is positioned onto the convex surface of the glass.

A holding pad, such as a self-adhesive sticker, for example a two-sided adhesive, is arranged between the acorn element and the glass convex surface.

The so-equipped glass is positioned onto one of the above-mentioned axial clamping members, the second axial clamping element thus clamping the glass onto its concave surface by means of an abutment, generally made in an elastomer.

During the machining step, a tangential torque stress is generated on the glass, which can result in the glass rotating relative to the acorn element if the glass-holding system is not efficient enough.

The efficient glass-holding mainly depends on the good adhesion at the interface between the holding pad and the glass convex surface.

The latest generation ophthalmic glasses most often comprise hydrophobic and/or oil-repellent anti-stain surface coatings associated with anti-reflection coatings.

These are most often fluorosilane-type materials that reduce the surface energy so as to prevent adhesive greasy stains which are thereby easier to remove.

One of the problems generated by this type of surface coating is that they achieve such an efficiency that the adhesion at the interface pad/convex surface is thereby altered, even compromised for the most efficient hydrophobic and/or oil-repellent coatings.

It becomes therefore more and more difficult to perform satisfactory trimming steps, more particularly for polycarbonate glasses the trimming of which results in much more important stresses than for other materials.

As a result of an inadequately performed trimming step, the glass is purely and simply ruined.

SUMMARY OF THE INVENTION

One of the objects of the invention aims at offering a means allowing to perform the trimming step for a glass comprising at the surface a hydrophobic and/or oil-repellent coating, such means being able to be incorporated into the glass manufacturing process and being easy to be implemented by the operator performing the trimming step.

Such a technical problem is solved according to the invention in that a temporary protective layer imparting to the glass a surface energy at least equal to 15 mJ/m$^2$ is coated onto a glass comprising a hydrophobic and/or oil-repellent surface coating.

Consequently, a sufficient adhesion at the interface holding pad/glass can be achieved for pads conventionally used in the technical field.

DETAILED DESCRIPTION OF THE INVENTION

It has already been previously suggested to coat temporary layers on ophthalmic glasses, but essentially with a view to ensuring their protection against scratches and damages which might occur when being handled. This is the case, for example, in the Patent Application WO 00/68326 relating to a method for manufacturing composite optical items from laminated optical films, the surface of such films having been preliminarily protected with a protective layer that can subsequently be dissolved.

In the present application, it is meant under the term "glass" any organic or mineral glass substrate, either treated or not, depending whether it comprises one or several various types of coatings or whether it remains bare.

When the glass comprises one or more surface coatings, the expression "to coat glass" means that a layer is applied on the glass outer coating.

The surface energies are calculated according to the Owens-Wendt method described in the following reference: "Estimation of the surface force energy of polymers", Owens D. K., Wendt R. G. (1969) J. APPL. POLYM. SCI, 13, 1741-1747.

The glasses treated using the method of the invention are glasses comprising a hydrophobic and/or oil-repellent surface coating and preferably glasses comprising both a hydrophobic and/or oil-repellent surface coating laid onto a mono- or a multilayered anti-reflection coating.

In fact, hydrophobic and/or oil-repellent coatings are generally applied onto glasses having an anti-reflection coating, more particularly in a mineral material, so as to reduce their strong tendency to staining, for example, towards greasy deposits.

As previously mentioned, the hydrophobic and/or oil-repellent coatings are obtained by the application, onto the anti-reflection coating surface, of compounds reducing the glass surface energy.

Such compounds are described in full detail in the prior art, for example, in the following documents U.S. Pat. No. 4,410,563, EP-0 203 730, EP-749 021, EP-844 265 and EP-933 377.

Silane-based compounds bearing fluorinated groups, more particularly perfluorocarbonate or perfluoropolyether group(s) are most often used.

By way of examples, silazane, polysilazane or silicone compounds can be mentioned which comprise one or more fluorinated groups such as mentioned hereabove.

A known method is to deposit on the anti-reflection coating compounds bearing fluorinated groupings and Si—R groupings, R being a —OH group or a precursor thereof, preferably an alkoxy group. Such compounds are able to conduct, at the anti-reflection coating surface, directly or after hydrolysis, polymerization and/or crosslinking reactions.

The application of compounds reducing the glass surface energy is conventionally carried out by immersion of said compound into a solution, by centrifugation or by deposit in steam phase, among others. Generally, the hydrophobic and/or oil-repellent coating has a thickness lower than 10 nm and more preferably lower than 5 nm.

The invention is preferably implemented on glasses comprising a hydrophobic and/or oil-repellent surface coating imparting a surface energy lower than 14 mJoules/m$^2$ and more preferably lower than or equal to 12 mJ/m$^2$.

The temporary protective coating will increase the glass surface energy up to a value of at least 15 mJoules/m$^2$.

It may be applied on an area covering all of at least one of the two glass faces or only on the area intended to receive the contact of the holding pad of said glass.

More precisely, it is usual to put the holding pad, associated with the acorn element, onto the glass convex face. It is therefore possible to coat with the protective layer all the convex face or, alternatively, only a central area of the convex face, using a mask or any other appropriate technique.

The deposit may uniformly coat the corresponding area, i.e., it shows a continuous structure, but it can also show a discontinuous structure, such as a weave shape.

In such a case, an intermittent deposit is formed, the surface thereof being still sufficient so as to allow the required adhesion of the holding pad.

The coatings with discontinuous structure can be obtained by tampography.

As a result of coating the temporary protective layer, a glass is obtained which is appropriate for trimming.

This means that after trimming according to the invention, the glass will have the required dimensions so as to be suitably inserted into the frame it is intended to be inserted into.

More precisely, such a result is achieved when the glass, during the trimming operation, is subjected to a maximum off-centring of 2°.

An optimum ability to trimming corresponds to a glass having an off-centring lower than or equal to 1°.

The protective layer is made of any material enabling to increase the surface energy with hydrophobic and/or oil-repellent properties and able to be eliminated during a subsequent later operation in the trimming step.

Evidently, the material should be such that it does not definitely alter the surface properties of the hydrophobic and/or oil-repellent coating and that after the latter has been eliminated, the optical and the glass surface properties are globally identical to those the glass used to show before the protective layer was laid.

Preferably, the temporary protective layer is a mineral layer, and more particularly, a fluoride or a mixture of metallic fluorides, an oxide or a mixture of metallic oxides.

Examples of fluorides can include magnesium fluoride MgF$_2$, lanthanum fluoride LaF$_3$, aluminium fluoride AlF$_3$ or cerium fluoride CeF$_3$.

Useful oxides are titania, alumina, zirconia or praseodymium oxide.

Alumina and praseodymium oxide mixtures are recommended.

A particularly recommended commercially available material is the PAS02 from Leybold Corporation.

The protective layer may be laid with any conventional appropriate method.

Generally, the anti-reflection, hydrophobic and/or oil-repellent coatings are laid by evaporation, in vacuum bells, and it is desirable to lay the temporary protective layer using the same technique, which makes it possible to carry out all the operations successively, with no unduly handling with the glasses between two steps.

When it is made of a mineral material, the protective layer thickness is preferably lower than 50 nm, and generally ranges from 1 to 50 nm and more preferably ranges from 5 to 50 nm.

Generally speaking, if the protective layer thickness is too low, there is the risk that the surface energy will be insufficiently modified.

If, on the other hand, the protective layer thickness is too high, more particularly for essentially mineral layers, the inventors have found out that mechanical stresses were likely to occur within the layer, which can be deleterious for the expected properties.

Preferably, and more particularly when the temporary protective layer is laid wholly on one of the glass faces, the material shows some degree of transparency allowing to carry out on the glass conventional power measurements with a front-focimeter.

Thus, the glass appropriate for trimming according to the invention preferably shows a transmission of at least 18%, more preferably at least 40% according to the ISO8980/3 standard.

As an alternative to the above-mentioned materials of mineral nature, conventional inks and/or the resins forming such ink binding agent can be used for marking the progressive ophthalmic glasses.

In such a case, much higher thickness can be coated than is the case in purely mineral layers.

The required thickness can then range from 5 to 150 microns.

Alkyd type resins are particularly recommended.

The glass appropriate for trimming according to the method of the invention can be subjected to a wholly conventional trimming operation, except that, in a final step, the temporary protective layer should be removed.

Thus, the invention also relates to a method for obtaining a trimmed glass having a hydrophobic and/or oil-repellent surface property, characterized in that it comprises the following steps of:

1) selecting a glass appropriate for trimming according to the invention,
2) holding said glass by an acorn element,
3) trimming said glass,
4) removing the acorn element from said glass,
5) recovering the thus trimmed glass, and
6) removing the temporary protective layer so as to restore the glass in its hydrophobic and/or oil-repellent surface properties.

As indicated hereabove, the proper trimming step 3) is conventional and is known to the man of the art.

It will consequently not be described in full detail.

It can be however stated that the preferentially used holding pads are double-sided self-adhesive stickers, for example, adhesives from 3M.

The temporary protective layer removing step may be carried out either in a liquid medium or by dry wiping or by a successive application of both methods.

The liquid medium removing step is preferably carried out by with an acidic solution, more particularly with an orthophosphoric acidic solution, at molarities ranging from 0.01 to 1 N.

The acidic solution may also comprise surfactants, either anionic, cationic or amphoteric.

The temperature at which the removing step is carried out is variable, but generally, the removing step is carried out at room temperature.

The temporary protective layer removal may also be enhanced by a mechanical action, preferably through using ultrasounds.

Generally, after the treatment with the liquid medium such as with an acidic solution, by dry wiping or a combination of both, the removing step comprises a cleaning step with an aqueous solution having a pH substantially equal to 7.

At the end of the temporary protective layer removal, the glass shows optical and surface features of the same order, even quasi identical to those of the initial glass, comprising the hydrophobic and/or oil-repellent coating.

The advantages associated to the invention are numerous.

The method according to the invention is easy to use.

More particularly, the man of the art may use conventional grinding machines and trimming methods, without having to modify them, or in an extremely restricted way.

The temporary protective layer removing step is fast.

Glasses appropriate for trimming according to the invention, more particularly glasses comprising a temporary protective layer of mineral material, may be subjected to markings using various inks, commonly used by the man of the art, for progressive glasses.

The following examples illustrate the present invention.

Example 1

1.1. Preparation of Glasses Comprising a Hydrophobic and Oil-Repellent Coating Organic glasses are prepared, bearing three anti-abrasion, anti-reflection, hydrophobic/oil-repellent coatings that are coated in said order on the substrate.

ORMA® organic glasses, having a −2.00 diopter power, obtained by polymerizing glycol diethylene diallyl carbonate (CR 39® monomer), and comprising an anti-abrasion coating of the polysiloxane type corresponding to example 3 of Patent Application EP-614,957 in the Applicant's name, are heated in a drying-room for 3 hours at a temperature of 100° C.

The glasses are subsequently placed in a LEYBOLD 1104 vacuum treatment device, provided with an electron gun and of a Joule effect evaporation source.

A secondary vacuum is created by pumping the substrates, without heating them.

With the electron gun, 4 high index (HI)/low index (BI)/HI/BI anti-reflection optical layers are successively evaporated: $ZrO_2$, $SiO_2$, $ZrO_2$, $SiO_2$.

Thereafter, a hydrophobic and oil-repellent coating is applied by evaporation of an OPTOOL DSX brand product (a compound comprising perfluoropropylene patterns) commercialized by DAIKIN corporation.

The product in a liquid form is poured into a copper capsule, the liquid is then allowed to dry at room temperature and at atmospheric pressure.

The copper capsule is then placed in a Joule effect crucible.

The product evaporation occurs under secondary vacuum.

The coated layer thickness is lower than 10 nm.

The coating thickness checking is performed using a quartz scale.

1.2. Coating of the Temporary Protective Layer

The temporary protective layer is then performed by evaporation coating.

A material identified as PASO 2, which is an alumina and praseodyme oxide mixture, commercialized by Leybold Corporation, is evaporated using an electron gun.

The evaporation is non reactive (without oxygen).

The physical thickness of the coated protective layer is 25 nm.

The coating thickness checking is performed using a quartz scale.

The glass is recovered after heating the enclosure and then put under the treatment chamber atmosphere.

1.3. Trimming

The glass resulting from step 1.2 is subjected to a conventional trimming operation on a grinding machine from Essilor corporation.

As a holding pad a 3M self-adhesive sticker is used with a 25 mm diameter and an acorn element from Essilor corporation having the same diameter.

The plastic:polycarbonate preform grinding machine has a 155 mm diameter and runs at 2850 tpm.

Upon the trimming operation, the glass off-centring is lower than 1°.

At that stage, the recovered trimmed glasses can be directly inserted into the frame they are intended to be inserted into, followed by a treatment according to the following step 1.4 or treated according to step 1.4 before being inserted into the frame.

1.4. Protective Layer Removal

For this step, an ultra-sound small vessel is used of the B2200 E2 BRANSON model.

Ultra-sound power: 60 watts

Ultra-sound frequency: 47 kHz/−6 kHz

The glasses obtained in step 1.3 are immerged into a 0.1 N diluted orthophosphoric acidic solution at room temperature (with ultra-sounds and without heating) for a period of time of 2 minutes, then rinsed with water or isopropyl alcohol and wiped.

The resulting glasses show excellent optical features as well as excellent hydrophobic and oil-repellent properties.

Example 2

Steps 1.1, 1.2 and 1.4 from example 1 are identically reproduced, excepted that they are performed on plane blades, of the same material as the ORMA® CR39® substrates.

The contact angles are measured at the various steps of the method.

Using plane blades makes these measurements easier.

The contact angles have been measured:

In a air conditioned room: room temperature T°=21°±1° C., relative humidity rate Rh=55%±5%.

With a GBX model Digidrop goniometer with 3 liquids: deionized water, glycerol and diiodomethane.

The surface energies are calculated according to the two-component Owens-Wendt model with the DGD/fast 60 device from GBX Instrumentations scientific corporation using a Windrop software.

The resulting results are listed in the following table:

TABLE 1

|  | Plane substrate obtained after step 1.1 (initial substrate) | Plane substrate obtained after step 1.2 (with Paso 2 temporary protective layer) | Plane substrate obtained after step 1.4 (after removal of Paso 2 temporary protective layer) |
| --- | --- | --- | --- |
| Water angle | 118° ± 0.75 | 49° ± 3.5 | 112° ± 0.95 |
| Glycerol angle | 105° ± 0.97 | 44° ± 0.9 | 103° ± 0.65 |
| Diiodomethane angle | 92° ± 2 | 30° ± 3.8 | 91° ± 3.72 |
| Polar component | 0.93 mJ/m$^2$ | 20.60 mJ/m$^2$ | 2.29 mJ/m$^2$ |
| Dispersive component | 10.34 mJ/m$^2$ | 31.99 mJ/m$^2$ | 9.78 mJ/m$^2$ |
| Total energy (Owens - Wendt) | 11.4 mJ/m$^2$ ± 0.5 | 52.6 Mj/m$^2$ ± 0.8 | 11.7 mJ/m$^2$ ± 0.5 |

It can be seen that with the Paso 2 based temporary protective layer, the surface energies are high: ophthalmic glasses made in such a material are thus able to be trimmed and allow a wide selection of self-adhesive stickers to be used, as well as a wide selection of inks for marking the glasses.

The surface energies achieved after the Paso 2 protective layer removal become again nearly identical to those achieved for the initial glass, comprising the anti-reflection coating and the hydrophobic and oil-repellent coating.

The surface characteristics of the hydrophobic and oil-repellent coating are maintained.

Example 3

ORMA® glasses, having a –2.00 diopter power, are treated according to the example 1, step 1.1 method, so as to obtain glasses with anti-reflection, hydrophobic and oil-repellent properties.

Said glasses are then treated by half: one half according to the protocol described in example 1 step 1.2 is coated with a protective layer, while the other half, masked with a metallic mask, is not coated with a protective layer.

The glass part coated with the protective layer is then treated according to the example 1, step 1.4 protocol, by immersion of half of the sample into an acid bath.

The following operations are performed on each of the two glass halves:

visual reflection Rv measurements and mean reflection Rm measurements according to the ISO/WD 8980-4 standard, colorimetric measurements of the tinting angle h and of the Chroma C* with a ZEISS spectrophotometer (angle 15°) and calculated in the CIE lab 1964 system (L*, a*, b*).

The resulting results are listed in table II hereunder.

TABLE II

|  | Half with no protective layer coating | Half with protective layer coating, followed by removal thereof |
| --- | --- | --- |
| h | 135° ± 2° | 135° ± 2° |
| C* | 7.2 | 7.3 |
| Rv | 0.72 | 0.71 |
| Rm | 0.74 | 0.75 |

The colorimetric values achieved after the Paso 2 layer has been coated followed by the removal thereof are nearly identical to those of the glass part which has not received the Paso 2 coating: the Paso 2 protective layer and its chemical removal do not modify the colorimetric characteristics of the anti-reflection coating.

Example 4

In this example, a temporary protective layer is coated by tampography. The coatings are done on glasses having a –2.00 diopter negative power made in ORMA® and identical to those obtained from step 1.1 in example 1.

An ink having a reference n°: 03XH622 2030 is used.

Diluent 4909

Manufacturer: Tiflex address: B.P. 3.01450. PONCIN.FRANCE.

10% diluent are added to the initial ink formulation so as to adapt the solution viscosity.

The tampography device used is of the MTHV2 type. (Manufacturer: Automation & Robotics)

The buffer being used is made of silicone.

Etched (depth 10 to 20 μm) and screened (20 to 40% filling rate) plate.

The ink is applied by tampography onto the glass.

Drying is done at room temperature or in a drying-room at 50° C. for a period of time higher than or equal to 5 minutes.

As a result, a discontinuous ink layer (screen) is obtained, the adhesion on the glass surface of which is sufficient so as not to be damaged during transportation.

The trimming of the thus coated glass is then carried out placing a 3M double-sided self-adhesive sticker onto the ink layer.

The resulting glasses are appropriate for trimming and can be inserted into frames after trimming.

A comparative example is made on a glass which does not comprise any temporary protective layer.

The glass is subjected to a high off-centring during the trimming operation and cannot be inserted into the corresponding frame.

The results obtained are listed in table III.

TABLE III

|  | Ink | Plate depth | screen | Drying | Trimming capacity |
| --- | --- | --- | --- | --- | --- |
| Ex 1 | Tiflex | 10–12 μm | 20% | air | Yes |
| Ex 2 | Tiflex | 10–12 μm | 25% | air | Yes |
| Ex 3 | Tiflex | 10–12 μm | 30% | air | Yes |
| Ex 4 | Tiflex | 10–12 μm | 40% | air | Yes |
| Comparative Example | — | — | — | — | No |

The invention claimed is:

1. A glass, comprising a hydrophobic and/or oil-repellent coating onto which a temporary protective layer is coated which imparts to the glass a surface energy at least equal to 15 mJ/m$^2$, wherein the protective layer comprises one or more metallic fluorides.

2. The glass of claim 1, wherein, before coating the protective layer, the glass comprising a hydrophobic and/or oil-repellent surface coating has an initial surface energy lower than or equal to 14 mJ/m$^2$.

3. The glass of claim 2, wherein the initial surface energy is lower than or equal to 12 mJ/m$^2$.

4. The glass of claim 1, wherein the protective layer is coated on an area covering all of at least one of the two faces of said glass.

5. The glass of claim 1, wherein the protective layer is coated only on an area adapted to receive the contact of a holding pad of said glass.

6. The glass of claim 1, wherein the protective layer shows a continuous structure.

7. The glass of claim 1, wherein the protective layer shows a discontinuous structure.

8. The glass of claim 7, wherein the protective layer is screen-shaped.

9. The glass of claim 1, wherein the fluoride is $MgF_2$, $LaF_3$, $AlF_3$ or $CeF_3$.

10. The glass of claim 1, wherein the protective layer has a thickness ranging from 1 to 50 nm.

11. The glass of claim 10, wherein the protective layer has a thickness ranging from 5 to 50 nm.

12. The glass of claim 1, wherein the hydrophobic and/or oil-repellent surface coating comprises a silane bearing fluorinated groups.

13. The glass of claim 1, wherein the hydrophobic and/or oil-repellent surface coating has a thickness lower than 10 nm.

14. The glass of claim 1, wherein the glass comprises an anti-reflection coating onto which the hydrophobic and/or oil-repellent coating is coated.

15. The glass of claim 14, wherein the anti-reflection coating is made of a mineral material.

16. The glass of claim 14, wherein the anti-reflection coating comprises several layers.

* * * * *